(12) United States Patent
Takahashi et al.

(10) Patent No.: US 9,212,957 B2
(45) Date of Patent: Dec. 15, 2015

(54) INSTALLATION STRUCTURE FOR TEMPERATURE SENSOR IN ELECTRICAL MACHINERY AND APPARATUS

(75) Inventors: Kazuhiko Takahashi, Hitachi (JP); Kengo Iwashige, Hitachi (JP); Kenichi Hattori, Hitachiota (JP); Yukihiro Yamamoto, Hitachi (JP); Yasunori Satake, Hitachinaka (JP); Takayasu Tanaka, Mito (JP); Toru Muto, Hitachi (JP); Seiichi Sawada, Hitachi (JP); Yasuaki Kageyama, Hitachi (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 165 days.

(21) Appl. No.: 13/198,771

(22) Filed: Aug. 5, 2011

(65) Prior Publication Data

US 2012/0043863 A1  Feb. 23, 2012

(30) Foreign Application Priority Data

Aug. 19, 2010   (JP) ................................ 2010-183614

(51) Int. Cl.
  *H02K 11/00*  (2006.01)
  *G01K 13/08*  (2006.01)
  *G01K 11/32*  (2006.01)
  *H02K 3/14*  (2006.01)

(52) U.S. Cl.
  CPC ................ *G01K 13/08* (2013.01); *G01K 11/32* (2013.01); *H02K 11/0047* (2013.01); *H02K 3/14* (2013.01); *Y10T 29/49002* (2015.01)

(58) Field of Classification Search
  CPC ........... H02K 11/00; H02K 3/24; H02K 1/26; H02K 3/34; H02K 3/48
  USPC ................ 310/68 C, 179, 180, 195, 201–208
  IPC ........................... H02K 11/00, 3/24, 3/34, 3/48
  See application file for complete search history.

(56) References Cited

U.S. PATENT DOCUMENTS

| | | | |
|---|---|---|---|
| 4,676,665 A * | 6/1987 | Twerdochlib | 374/152 |
| 5,300,844 A * | 4/1994 | Schuler | 310/215 |
| 6,274,240 B1 * | 8/2001 | McBane | 310/179 |
| 6,721,470 B2 | 4/2004 | Bosselmann et al. | |
| 2002/0196994 A1 * | 12/2002 | Bosselmann et al. | 385/12 |
| 2005/0013342 A1 | 1/2005 | Kaminski et al. | |
| 2005/0082084 A1 * | 4/2005 | Drubel et al. | 174/129 R |
| 2006/0029810 A1 * | 2/2006 | Markovitz et al. | 428/413 |

FOREIGN PATENT DOCUMENTS

| | | |
|---|---|---|
| JP | 63-15653 A | 1/1988 |
| JP | 2000-299967 A | 10/2000 |
| JP | 2003-518905 A | 6/2003 |
| JP | 2005-37399 A | 2/2005 |
| JP | 2009-222715 A | 10/2009 |

* cited by examiner

*Primary Examiner* — Michael Andrews
(74) *Attorney, Agent, or Firm* — Crowell & Moring LLP

(57) ABSTRACT

In an electrical machinery and apparatus, a storage space is formed along an extension direction of a strand, and a temperature sensor is installed in the storage space of the strand, so that temperature of the strand can be immediately measured, and no pressure is applied to the temperature sensor in the process of forming a ground wall insulation thereby the temperature of the strand can be accurately measured.

8 Claims, 3 Drawing Sheets

INSTALLATION STRUCTURE FOR TEMPERATURE SENSOR IN ELECTRICAL MACHINERY AND APPARATUS

CLAIM OF PRIORITY

The present application claims priority from Japanese Patent application serial No. 2010-183614, filed on Aug. 19, 2010, the content of which is hereby incorporated by reference into this application.

TECHNICAL FIELD

The present invention relates to an electrical machinery and apparatus including a rotating machinery, such as a turbine generator, and so forth, and a static apparatus, such as a transformer and so forth, and in particular, to an electrical machinery and apparatus having an insulated bar formed by assembling strands.

BACKGROUND ART

With the electrical machinery and apparatus having the insulated bar formed by assembling the strands, such as, for example, the turbine generator, a temperature sensor is disposed in close proximity to the strand to which strand insulation has been applied, as disclosed in, for example, Patent Document 1, in order to measure temperature of the strand.

CITATION LIST

Patent Literature

Patent Document 1
JP-A-2009-222715 (corresponding to U.S.-A, Ser. No. US2009/0232183 A1)

SUMMARY OF THE INVENTION

Technical Problem

According to measurement of the temperature of the strand disclosed in Patent Document 1, because a temperature sensor is disposed in close proximity to the strand, it is presumed that an accurate temperature of the strand can be detected.

However, since the temperature sensor is disposed between the strands adjacent to each other, a pressure is occasionally applied to the temperature sensor in the process of forming a ground wall insulation at the time of wrapping an insulating tape around the strands, and so forth, so that the temperature sensor is damaged, or a measured value is caused to undergo variation by applying a pressure to the temperature sensor, thereby raising a possibility that measurement of an accurate temperature of the strand cannot be carried out. Further, because the temperature of the strand is measured via strand insulation, there is a possibility that measurement of an accurate temperature of the strand cannot be carried out.

It is an object of the invention to provide an electrical machinery and apparatus capable of measuring an accurate temperature of a strand without applying a pressure to a temperature sensor.

Solution to Problem

To that end, with the present invention, a storage space is formed in a strand along an extension direction of the strand, and a temperature sensor is installed in the storage space.

Because the temperature sensor is installed in the storage space formed in the strand, as described above, temperature of the strand can be directly measured, and because the temperature sensor is placed inside the storage space, no pressure is applied to the temperature sensor in the process of forming a ground wall insulation, at the time of wrapping an insulating tape around the strands, and so forth, so that the temperature of the strand can be accurately measured.

Advantageous Effects of Invention

As described in the foregoing, with the present invention, it is possible to obtain an electrical machinery and apparatus capable of measuring an accurate temperature of a strand without applying a pressure to a temperature sensor.

DESCRIPTION OF EMBODIMENTS

Figure 1:
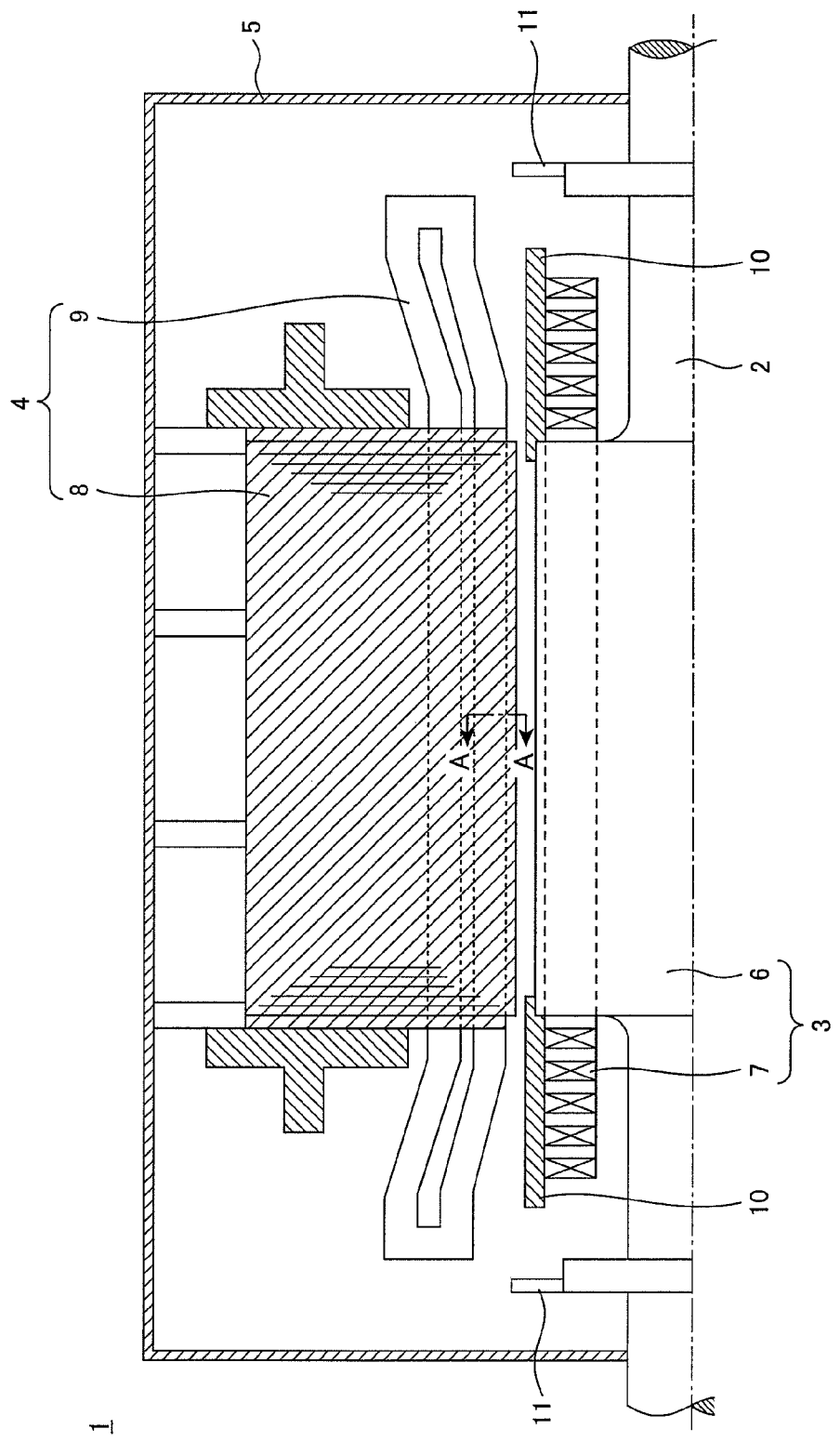
FIG. 1 is a schematic sectional side view showing an upper half portion of a turbine generator, in longitudinal section, as one embodiment of an electrical machinery and apparatus according to the invention.

An electrical machinery and apparatus according to one embodiment of the invention is described hereinafter on the basis of a turbine generator, with reference to FIGS. 1 to 5.

A turbine generator 1 comprises a rotor 3 integrally formed with a rotor shaft 2, a stator 4 disposed over the rotor 3 through the intermediary of a gap therebetween in the radial direction of the rotor 3, and a stator frame 5 for supporting the stator 4, and axially supporting the rotor shaft 2 through the intermediary of a bearing device (not shown).

The rotor 3 includes a rotor core 6 in the shape of a mass integrally formed with the rotor shaft 2, and a rotor coil 7 fitted into slots (not shown) formed in the rotor core 6. Meanwhile, the stator 4 includes a stator core 8 formed by stacking a multitude of magnetic steel sheets one after another, and a stator coil 9 fitted into slots (not shown) formed in the stator core 8.

Besides the above, a retaining ring 10 is fixedly attached to respective ends of the rotor core 6, in the axial direction of the rotating shaft 2, the retaining ring 10 being provided for holding the coil end of the rotor coil 7, jutting out from the respective slots of the rotor core 6, against centrifugal force. Furthermore, a part of the rotor shaft 2, extended on respective sides of the rotor core 6, is provided with a cooling fan 11 for circulating a cooling medium around the rotor 3, and the stator 4.

Figure 2:
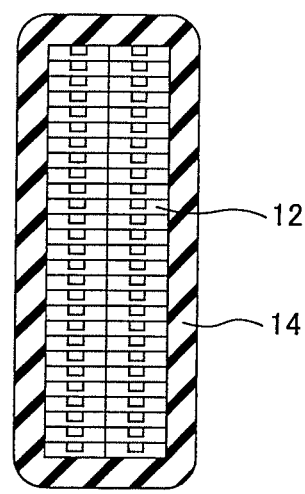
FIG. 2 is an expanded sectional view of a stator coil, taken on line A-A of FIG. 1.
Figure 3:
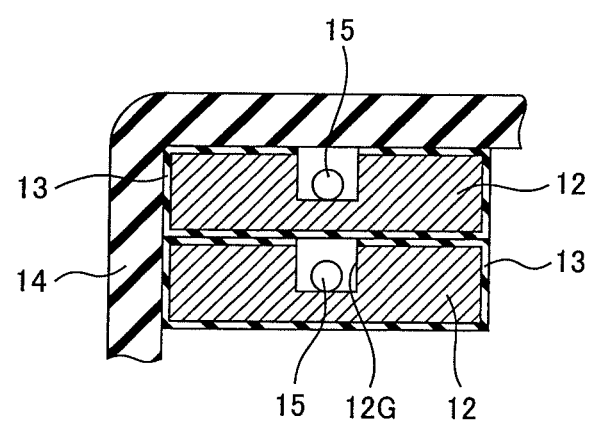
FIG. 3 is an expanded sectional view showing a portion of strands of the stator coil shown in FIG. 2.

As shown in FIGS. 2, and 3, the stator coil 9 of the turbine generator 1 configured as above, is formed by consolidating a plurality of strands 12 made up of a rectangular wire with a strand insulation 13 formed on the outer periphery thereof, and providing a ground wall insulation 14 on the outer periphery of the strands.

Further, a concave groove 12G rectangular in sectional shape, serving as a storage space is formed on a wide-width surface of the strand 12, with the strand insulation 13 provided thereon, by excavating along an extension direction of the strand. A temperature sensor, such as, for example, a fiber optic temperature sensor 15, is stored in the concave groove 12G. The fiber optic temperature sensor 15 is a sensor in which a plurality of fiber bragg grating sensors are provided along an optical fiber at predetermined intervals, thereby enabling temperature measurement to be concurrently executed at a plurality of locations.

When the strands 12 with the fiber optic temperature sensor 15 stored in the respective concave grooves 12G are consolidated, even if, for example, a cut due to excavation of the concave groove 12G exists in the strand insulation 13 on the upper side of the strand 12 (lower strand) positioned on the lower side of the strands assembled, the strand insulation 13 of the strand 12 (upper strand) adjacent to the lower strand 12, positioned on the upper side, is placed so as to block the concave groove 12G, so that short circuit does not occur between the lower strand and the upper strand adjacent to each other. Furthermore, even if a cut due to the excavation of the concave groove 12G exists in the strand insulation 13 on the upper side of the strand 12 positioned at the top of the strands assembled, no problem will arise because the ground wall insulation 14 is formed over the cut of the top strand 12.

Thus, the fiber optic temperature sensor 15 stored in the concave groove 12G is positioned in the storage space covered by the strand insulation 13 or the ground wall insulation 14, and is in direct contact with the strand 12, so that the fiber optic temperature sensor 15 is capable of directly measuring the temperature of the strand 12 without being subjected to external force.

After assembling the plurality of strands 12 with the fiber optic temperature sensor 15 stored in the respective concave grooves 12G, a main insulating tape is wrapped around the strands assembled, thereby forming the ground wall insulation 14. In forming the ground wall insulation 14, the ground wall insulation 14 may be formed by wrapping a main insulating tape around the strands assembled, and subsequently impregnating the main insulating tape with an insulating resin, and heat curing the insulating resin, or by wrapping a main insulating tape impregnated with a semi-cured insulating resin around the strands assembly and heat curing the insulating resin, as is well known.

As described in the foregoing, with the present embodiment of the invention, no pressure is applied to the fiber optic temperature sensor 15 at the time of wrapping with the main insulating tape, and the fiber optic temperature sensor 15 is in direct contact with the strand 12, so that the temperature of the strand 12 can be accurately measured.

In the present embodiment of the invention, an operation of assembling the plurality of strands 12 with the fiber optic temperature sensor 15 stored in each of the strands 12 is executed after excavating the concave groove 12G in the strand 12 with the strand insulation 13 provided thereon, and storing the fiber optic temperature sensor 15 in the concave groove 12G. At the time of this assembling operation, the fiber optic temperature sensor 15 occasionally pops out of the concave groove 12G. For this reason, the operation for assembling the strands 12 has to be conducted while preventing the fiber optic temperature sensor 15 from popping out of the concave groove 12G, raising concern about a possibility of the operation turning burdensome.

Figure 4:
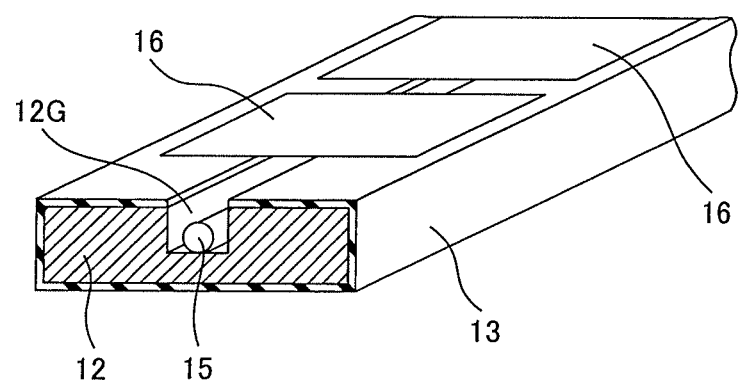
FIG. 4 is an expanded perspective view showing one length of the strand of FIG. 3.

In such a case, if an insulating and adhesive tape 16 is stuck to a plurality of locations on a wide-width surface of the strand 12, on the side of an opening of the concave groove 12G, as shown in FIG. 4, after the fiber optic temperature sensor 15 is stored in the concave groove 12G, this will prevent the fiber optic temperature sensor 15 from popping out of the concave groove 12G, thereby eliminating the concern about the possibility of the operation turning burdensome.

The stator coil 9 of the turbine generator 1, serving as the insulated bar of an electrical machinery and apparatus, is described in the foregoing, however, the present embodiment of the invention is also applicable to measurement of temperature of the rotor coil 7 fitted into the slots formed in the rotor core 6.

More specifically, with the rotor coil 7 of the turbine generator 1, strands, each being made up of a rectangular wire lager in width than the strand 12 of the stator coil 9, are generally stacked in the vertical direction of a slot one after another through the intermediary of an insulation sheet, so that a concave groove serving as a storage space is formed in a wide-width surface of the strand, and the fiber optic temperature sensor 15 is stored in the concave groove, thereby rendering it possible to measure temperature at multiple points of the rotor coil 7.

Further, since the rotor coil 7 is subjected to centrifugal force during an operation of the turbine generator 1, if the concave groove excavated in the strand is formed such that an opening of the concave groove faces to the inside diameter side of the rotor 3 (the center side in the radial direction of the rotor 3), this will cause the fiber optic temperature sensor 15 to be brought into intimate contact with the strand at the bottom of the concave groove by the centrifugal force, so that it is possible to accurately measure the temperature of the strand.

Still further, because the turbine generator 1 in operation is subjected to mechanical vibrations and magnetic vibrations, the fiber optic temperature sensor 15 stored in the concave groove 12G of the rotor coil 7, or the stator coil 9 is subjected to vibrations to occasionally make a movement inside the concave groove.

If such a movement of the fiber optic temperature sensor 15, inside the concave groove, should be avoided, the concave groove may be formed so as to match in sectional shape with the fiber optic temperature sensor 15 to thereby prevent the movement, and further, the periphery of the fiber optic temperature sensor 15 in contact with the bottom of the concave groove may be filled up with an insulating filler, or may be adhered to the concave groove with the use of an insulating binder to thereby prevent the movement. Besides the above, if displacement to a degree, occurring to the fiber optic temperature sensor 15 in the concave groove, causes no harm, the fiber optic temperature sensor 15 may be inserted into a protection tube to thereby prevent damage caused by vibrations.

Figure 5:
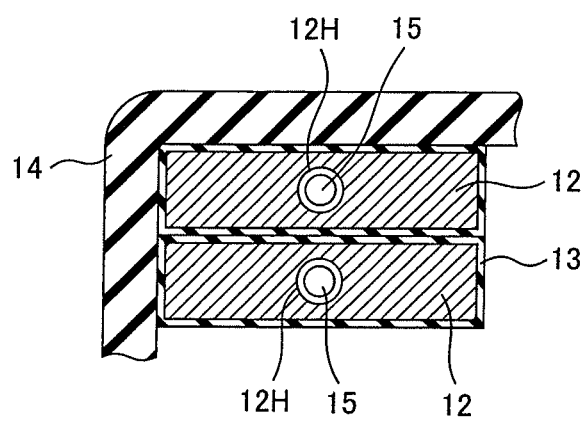
FIG. 5 is an expanded sectional view showing a portion of different strands.

Further, there is described an example in which the concave groove 12G, serving as the storage space provided in the strand 12, is rectangular in sectional shape, however, it is to be pointed out that the invention is not limited thereto, and that the concave groove 12G may be, for example, a groove resembling the letter V in sectional shape, or a groove semicircular in sectional shape. Furthermore, a hole 12H serving as the storage space may be formed along the extension direction of the strand, in the strand 12, as shown in FIG. 5, and the fiber optic temperature sensor 15 serving as the temperature sensor may be stored in the hole 12H.

Further, there is described an example in which the fiber optic temperature sensor is used as the temperature sensor, however, a common temperature measuring device may be alternatively installed in the concave groove 12G, or the hole 12H to thereby execute a temperature measurement.

In the foregoing description, the turbine generator 1 as the electrical machinery and apparatus having the insulated bar is described, however, it goes without saying that the invention is applicable not only to an insulated bar used in a rotating machinery, such as a water turbine generator, a large motor, and so forth, but also to an insulated bar used in a static apparatus, such as a transformer and so forth.

What is claimed is:

1. An electrical machinery and apparatus comprising:
   a rotor having an insulated bar, the insulated bar having strands assembled and a ground wall insulation formed on the outer periphery of the strands assembled, each of the strands being made up of a rectangular wire and having a strand insulation, a first wide-width surface facing the inside diameter side of the rotor, a second wide-width surface facing the outside diameter side of the rotor, and a storage space formed along an extension direction of the strand and being a groove formed on the first wide-width surface of the strand; and
   a temperature sensor that is stored in the storage space, wherein
      the groove is formed by removing the strand insulation and the wire at a region on the side of the first wide-width surface of the strand, such that the temperature sensor directly contacts the wire, and
      the strand insulation is formed on the outer periphery of the strands, except for a portion of the outer periphery of the strands at which the groove is formed.

2. The electrical machinery and apparatus according to claim 1, wherein the temperature sensor is a fiber optic temperature sensor.

3. The electrical machinery and apparatus according to claim 1, wherein the storage space is a hole.

4. The electrical machinery and apparatus according to claim 1, wherein the storage space is defined by a region substantially devoid of the strands.

5. The electrical machinery and apparatus according to claim 4, wherein the region substantially devoid of the strands defines a concave groove.

6. The electrical machinery and apparatus according to claim 1, wherein along a length of the insulated bar, a portion of the outer periphery of the strands and an adhesive tape alternatingly define a portion of an outer periphery of the insulated bar.

7. An electrical machinery and apparatus comprising:
   a rotor having an insulated bar, the insulated bar having strands assembled thereon, the strands: i) being made up of a rectangular wire, ii) having a strand insulation, and iii) having a storage space formed along a length of the insulated bar; and
   a temperature sensor that is disposed on the storage space, wherein
      a first wide-width surface of the strands faces the inside diameter side of the rotor,
      a second wide-with surface of the strands faces the outside diameter side of the rotor,
      the storage space is a groove formed on the first wide-width surface of the strands,
      the groove is formed by removing the strand insulation and the wire at a region on the side of the first wide-width surface of the strand, such that the temperature sensor directly contacts the wire, and
      the strand insulation is formed on the outer periphery of the strands, except for a portion of the outer periphery of the strands at which the groove is formed.

8. The electrical machinery and apparatus according to claim 7, wherein along the length of the insulated bar, a portion of the outer periphery of the strands and an adhesive tape alternatingly define a portion of an outer periphery of the insulated bar.

* * * * *